Dec. 9, 1924.
1,518,550
A. L. PUTNAM
SELF CONTAINED DEMOUNTABLE WHEEL AND HUB CAP
Filed July 14, 1919
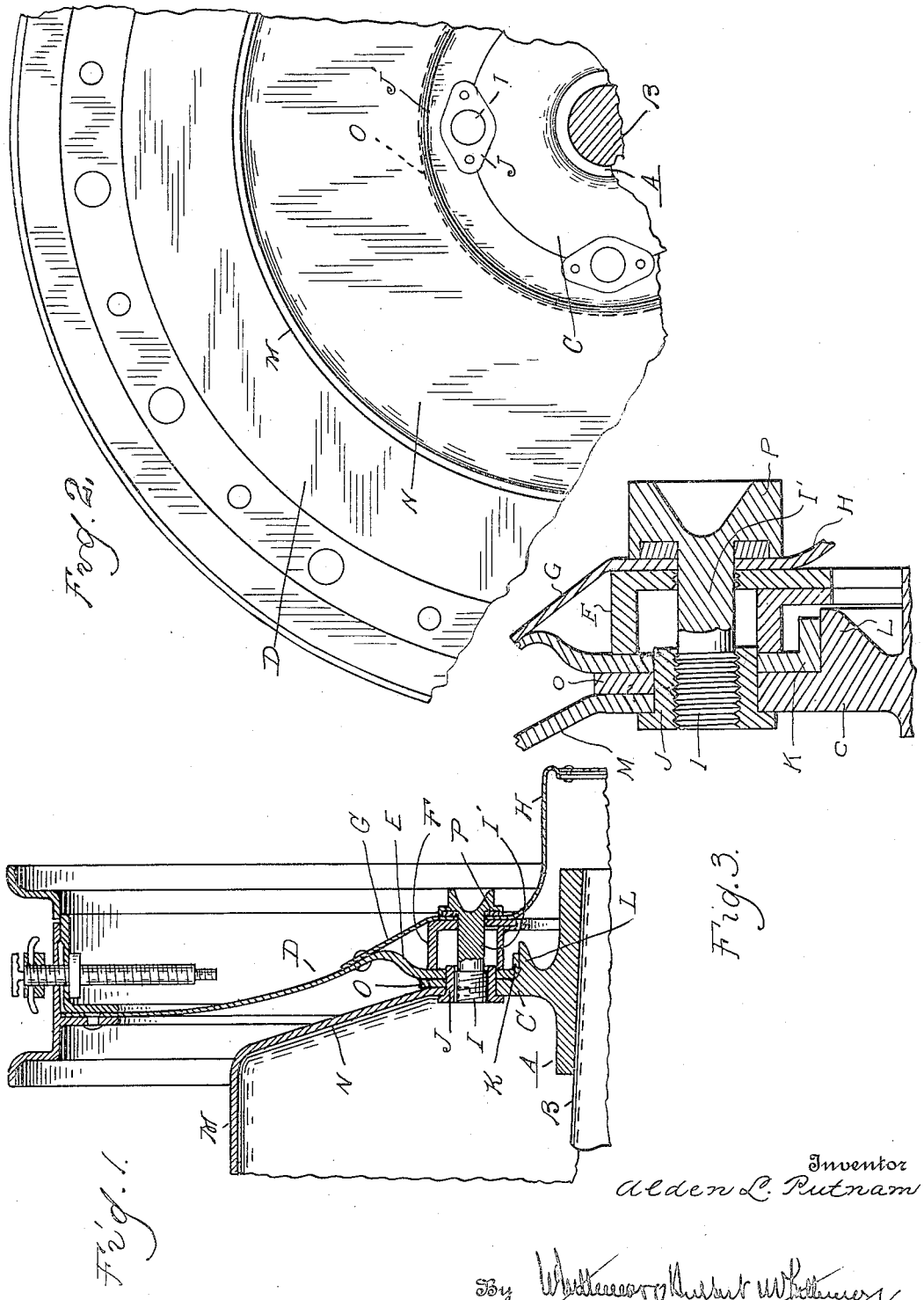
Inventor
Alden L. Putnam
By
Attorneys Patented Dec. 9, 1924.

1,518,550

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

SELF-CONTAINED DEMOUNTABLE WHEEL AND HUB CAP.

Application filed July 14, 1919. Serial No. 310,774.

*To all whom it may concern:*

Be it known that I, ALDEN L. PUTNAM, a citizen of the United States of America, residing at Detroit, in the county of Wayne and State of Michigan, have invented certain new and useful Improvements in Self-Contained Demountable Wheels and Hub Caps, of which the following is a specification, reference being had therein to the accompanying drawings.

The invention relates to demountable wheels of the disk type and it is the primary object of the invention to obtain a construction in which the wheel is mountable and demountable as a unit having no detachable parts. The invention has further reference to various features of construction as hereinafter set forth.

In the drawings:
Figure 1 is a section through the demountable wheel in the plane of the axis;

Figure 2 is a sectional elevation of the construction shown in Figure 1;

Figure 3 is a detail view drawn to an enlarged scale of a portion of the construction shown in Figure 1.

A is the hub of the wheel mounted upon the revoluble axle B; C is the hub flange extending radially outward therefrom; D is the disk which is of dished form and is preferably provided with the reversely dished central portion E; F is an annular clamping flange, preferably of channel-shaped cross-section, which is arranged concentric with the axis of the disk and is secured thereto by a hub cap G. This cap is preferably formed of a light gauge sheet metal stamping, which is riveted or otherwise secured to the disk and after passing over the flange F extends outward at H to surround the outer portion of the hub A. I are clamping bolts engaging the flange F and securing the same to the flange C of the hub. These bolts I have threaded inner ends which preferably engage threaded sleeves J extending through apertures in the flange C and aligned apertures in the disk D. The threaded ends of the bolts I also pass through threaded apertures in the clamping ring F, but the shank portions of said bolts I' are unthreaded and of slightly smaller diameter so as to freely slide within the threaded apertures in the clamping flange. K is a foot flange on the disk which engages a shoulder L on the hub to center the disk with said hub.

With the construction as described the disk clamping ring F, hub cap G and clamping bolts I constitute a unit separable from the hub, but not normally detachable from each other. To mount the wheel it is slipped upon the hub the flange K engaging the shoulder L to hold the parts in concentric relation and by then slightly rotating the disk the apertures therein may be registered with the sleeve J and engaged therewith. The threaded portions of the bolts I are initially in the recess within the clamping member F and are arranged in alignment with the threaded sleeves J. These bolts may be then successively screwed into the sleeves, this being permitted by the sliding engagement between the unthreaded shanks I' and the clamping member. When all of the bolts are tightened, the wheel will be securely mounted, the load being carried through the engaging shoulders K and L and the torque stress being carried into the sleeves J. Thus the bolts I are relieved from all shearing stress and are subjected only to tension stresses.

To demount the wheel the bolts I are successively unscrewed from engagement with the sleeves or bushings J, but are not detached from the clamping member F inasmuch as the threaded portion of the bolt can only be disengaged by screwing it outward through the threaded aperture in said clamping member. When all of the bolts are unfastened, the wheel together with the hub cap can be detached as a unit.

Where the wheel is provided with a brake drum, this is preferably of the construction shown, in which M is the drum and N is an inwardly-extending flange which is coned sufficiently to clear the reversely dished portion E of the disk. The inner portion of this flange N is parallel to the plane of the wheel and engages a shouldered bearing O on the flange C. It is then secured to said flange by the sleeves or bushings J, which preferably are formed with ears or flanges J' riveted or otherwise secured to the flange C.

The wheel may be mounted either as shown in Figure 1, where the dished center extends outward with respect to the axle, or it may be mounted as shown in Figure 2 where the dish of the disk is oppositely arranged. Inasmuch, however, as the hub cap is permanently attached to the disk, the latter can not be reversed without reassembly.

One advantage of the construction is that the hub cap being permanently secured will form an effective seal against the entrance of water, mud or dust, and to prevent leakage through the bolt apertures, sealing gaskets P may be used as shown.

What I claim as my invention is:

1. The combination with a wheel hub having a radially outwardly-extending flange, of a demountable wheel body for engaging said hub, an annular clamping member for said body, a hub cap enclosing said annular clamping member and permanently secured to said body, and means for securing said clamping member to said flange permanently carried by the demountable unit, and bushings engaging said flange engageable by said securing means.

2. The combination with a hub, of a demountable wheel body therefor, an annular clamping member of channel cross-section permanently attached to said wheel body, a clamping bolt having a threaded end portion adapted to be screwed through a threaded aperture in the web of said clamping member and provided with a plane portion of lesser diameter in rear of said threaded portion slidable within said threaded aperture, and a threaded socket upon said hub with which said bolt is engageable.

3. The combination with a hub having a radially outwardly-extending flange, of a demountable wheel body adapted to seat against said flange, an internally threaded headed bushing engaging an aperture in said flange and engageable with a registering aperture in said wheel body, a clamping member permanently attached to said wheel body apertured in registration with said bushing and correspondingly threaded, being provided with a recess in its inner face, a clamping bolt having a threaded end portion adapted to be screwed through the threaded aperture in said clamping member to engage the recess therein and having a plane shank portion slidable through the threads in said clamping member permitting the screwing of the threaded portion of the bolt into said internally threaded bushing.

4. The combination with a wheel hub, of a wheel body demountably engaging said hub, a hub cap for enclosing said hub, an annular clamping member, and means permanently attached to said wheel body for securing the same to said hub, said hub cap, annular clamping member, securing means and wheel body forming a single demountable unit.

In testimony whereof I affix my signature.

ALDEN L. PUTNAM.